(12) United States Patent
Binet et al.

(10) Patent No.: US 7,891,384 B2
(45) Date of Patent: Feb. 22, 2011

(54) FLEXIBLE TUBULAR PIPE FOR TRANSPORTING GASEOUS HYDROCARBONS

(75) Inventors: Eric Binet, Roumare (FR); Tim Crome, Asker (NO)

(73) Assignee: Technip France (FR)

( * ) Notice: Subject to any disclaimer, the term of this patent is extended or adjusted under 35 U.S.C. 154(b) by 0 days.

(21) Appl. No.: 12/597,599

(22) PCT Filed: Apr. 24, 2008

(86) PCT No.: PCT/FR2008/000589
§ 371 (c)(1),
(2), (4) Date: Dec. 10, 2009

(87) PCT Pub. No.: WO2008/145861
PCT Pub. Date: Dec. 4, 2008

(65) Prior Publication Data
US 2010/0084035 A1    Apr. 8, 2010

(30) Foreign Application Priority Data
Apr. 27, 2007    (FR)   ................................ 07 03083

(51) Int. Cl.
*F16L 11/00*   (2006.01)
(52) U.S. Cl. .................. 138/135; 138/134; 138/104
(58) Field of Classification Search .............. 138/134, 138/135, 104
See application file for complete search history.

(56) References Cited
U.S. PATENT DOCUMENTS

| | | | | |
|---|---|---|---|---|
| 4,465,105 A | * | 8/1984 | Slater | 138/104 |
| 4,867,205 A | * | 9/1989 | Bournazel et al. | 138/130 |
| 5,406,984 A | * | 4/1995 | Sugier et al. | 138/135 |
| 5,654,499 A | * | 8/1997 | Manuli | 73/40.5 R |
| 5,813,439 A | * | 9/1998 | Herrero et al. | 138/134 |
| 5,934,335 A | * | 8/1999 | Hardy | 138/131 |
| 6,006,788 A | * | 12/1999 | Jung et al. | 138/131 |
| 6,085,799 A | * | 7/2000 | Kodaissi et al. | 138/135 |
| 6,123,114 A | * | 9/2000 | Seguin et al. | 138/124 |
| 6,283,161 B1 | * | 9/2001 | Feret et al. | 138/134 |

(Continued)

FOREIGN PATENT DOCUMENTS

FR    2 557 254 A    6/1985

(Continued)

OTHER PUBLICATIONS

International Search Report dated Nov. 19, 2008, issued in corresponding international application No. PCT/FR2008/000589.

*Primary Examiner*—Patrick F Brinson
(74) *Attorney, Agent, or Firm*—Ostrolenk Faber LLP

(57) ABSTRACT

The invention relates to a flexible tubular duct for transporting gases under high pressure in the field of offshore oil exploitation. The duct is of the unlinked and smooth passageway type, and comprises from inside to outside an inner polymer tube, a pressure vault formed by the short-pitch rolling of at least one wire, a first inner pair of crossed traction armor plies, an intermediate polymer sleeve, a second outer pair of crossed traction armor plies and an outer polymer sleeve. The inner pair of traction armor plies is wound with a helical angle of less than 35° and the outer pair of traction armor plies is wound with a helical angle substantially equal to 55°.

5 Claims, 2 Drawing Sheets

U.S. PATENT DOCUMENTS

| | | | |
|---|---|---|---|
| 6,843,278 B2 * | 1/2005 | Espinasse | 138/134 |
| 7,445,030 B2 * | 11/2008 | Hardy et al. | 138/135 |
| 7,530,372 B2 * | 5/2009 | Gerez et al. | 138/134 |
| 2004/0066035 A1 * | 4/2004 | Buon et al. | 285/222.2 |
| 2005/0115623 A1 * | 6/2005 | Coutarel et al. | 138/135 |

FOREIGN PATENT DOCUMENTS

| | | |
|---|---|---|
| FR | 2 619 193 A | 8/1989 |
| FR | 2 775 051 A | 8/1999 |
| FR | 2 775 052 | 8/1999 |
| FR | 2 816 389 A | 5/2002 |
| FR | 2 837 870 A | 10/2003 |
| FR | 2 846 395 | 4/2004 |
| FR | 2 852 658 | 9/2004 |
| FR | 2 856 131 | 12/2004 |
| FR | 2 858 841 A | 2/2005 |
| WO | WO 2004/005785 | 1/2004 |

* cited by examiner

FLEXIBLE TUBULAR PIPE FOR TRANSPORTING GASEOUS HYDROCARBONS

CROSS REFERENCE TO RELATED APPLICATION

The present application is a 35 U.S.C. §§371 national phase conversion of PCT/FR2008/000589, filed Apr. 24, 2008, which claims priority of French Application No. 0703083, filed Apr. 27, 2007, incorporated by reference herein. The PCT International Application was published in the French language.

BACKGROUND OF THE INVENTION

The present invention relates to a flexible tubular pipe for transporting fluids (especially gaseous hydrocarbons) and to be used in an offshore oil production field. It relates more particularly to a flexible pipe of the unbonded type for transporting gaseous hydrocarbons or two-phase hydrocarbons containing a gaseous phase.

These flexible pipes, which are formed from a combination of various superposed concentric layers, are called unbonded pipes whenever these layers have a certain freedom to move relative to one another. These flexible pipes comply with, among others, the recommendations of the normative document API 17J "Specification for Unbonded Flexible Pipe" published by the American Petroleum Institute. The constituent layers comprise especially polymeric sheaths, generally for providing a sealing function, and reinforcing layers intended to take up the mechanical forces and which are formed by windings of metal wires or strips or various tapes or sections made of composites.

Unbonded flexible pipes used most often in the offshore oil industry generally comprise, from the inside outward, an internal carcass consisting of an interlocking strip which serves to prevent the pipe from collapsing under the effect of the external pressure, a polymeric internal sealing sheath, a pressure vault consisting of at least one interlocking profiled metal wire wound helically in a short pitch, said pressure vault serving to take up the radial forces associated with the internal pressure, tensile armor plies formed by long-pitch helical windings of metal or composite wires, said armor plies being intended to take up the longitudinal forces undergone by the pipe, and finally an external sealing sheath intended to protect the reinforcing layers from seawater. Such a pipe is called a rough-bore pipe since the innermost element is the internal carcass that forms a rough bore owing to gaps between the turns of the carcass.

Flexible pipes of the smooth-bore unbonded type that do not have an internal carcass are also known, in which the innermost element is a smooth-walled impermeable polymeric tube.

Smooth-bore pipes are generally used for conveying fluids that do not have a gaseous phase. In practice, their use is reserved for water injection pipes. This is because, in the case of two-phase fluids, diffusion during the flow of gas along the polymeric internal sealing tube causes an increase in the pressure within the annular space lying around the internal sheath. When the pressure in the annular space becomes greater than the internal pressure in the pipe, such as for example when a decompression occurs following a production shutdown, the pressure difference may result in the internal polymeric sealing tube collapsing. It is, among other things, to avert this risk that an internal carcass is preferably placed inside said internal polymeric tube, which amounts to producing a rough-bore pipe. This is why it is general practice to use rough-bore pipes for transporting gaseous or two-phase hydrocarbons.

One problem is apparent with rough-bore pipes for the production and exportation of gaseous hydrocarbons. This problem is due to the flow of gas in the pipe and more precisely to the formation of vortices that appear in contact with the gaps between the turns of the carcass. Specifically, the surface discontinuity encountered at these gaps leads to the formation of vortices that disturb the flow of gas in the pipe. These vortices induce cyclic pressure fluctuations that may lead to resonance phenomena (vibrations, noise) in the pipe and at the equipment and pipework located on the platform or the floating production support, and also in the submerged equipment. These pressure fluctuations, and most particularly these resulting vibrations, may become very substantial and lead to fatigue phenomena, especially in said equipment and at the ends of the pipes that then undergo larger stresses than those for which said pipes have been designed, which may result in leaks.

Patent application FR 2 856 131 discloses a first solution of this problem, consisting in lining the inside of the rough-bore pipe with a polymeric sheath pierced by holes.

Patent application WO 2004/005785 teaches a second solution consisting in providing the internal carcass of the rough-bore pipe with longitudinal through-passages, said through-passages making it easier for the gas to flow toward the inside of the turns of the carcass so as to prevent the formation of vortices at the gaps between turns.

These two solutions prove to be expensive and tricky to implement.

Patent applications FR 2 775 052, FR 2 846 395 and FR 2 852 658 disclose particular smooth-bore pipes that can transport gaseous hydrocarbons. These pipes include an intermediate impermeable polymeric sheath lying between the pressure vault and the tensile armor plies. In the event of the external sheath accidentally tearing, the external hydrostatic pressure is taken up by this intermediate sheath, which is itself supported by the pressure vault. This has the effect of protecting the internal sealing tube and of preventing it from collapsing on itself. In addition, the annular space lying between the internal sealing tube and said intermediate sheath is provided with a drainage layer for draining away the diffusion gases, said layer being intended to evacuate these gases along this annular space up to one of the two ends of the pipe. In FR 2 775 052, the drainage layer consists of a pair of armor plies wound around the pressure vault at an angle of greater than 35°. In FR 2 846 395 and FR 2 852 658, the drainage layer consists of specific sections that include recesses and are helically wound around the pressure vault with an angle of greater than 55°. The drainage layer makes it possible to limit the risk of overpressurizing the diffusion gases in the annular space and therefore the risk of the internal tube collapsing. However, these solutions do not satisfactorily solve the problem of safety and reliability when transporting gaseous hydrocarbons under very high pressure. This is in particular the case of export pipes intended to convey gas, purified and compressed beforehand, over large distances and at a very high flow rate. Under these severe conditions, the diffusion of gas through the sealing tube reaches a high level, thereby requiring very effective drainage means in order to avoid the risk of said tube collapsing. Moreover, if such an incident were to occur, for example following depressurization of the pipe, it would be very difficult to detect this. If ever the sealing tube were to collapse on itself and be damaged without this being detected, the pipe would run the risk of bursting upon repressurization, with particularly serious consequences.

FR 2 775 051 discloses a pipe intended to solve other problems, the structure of said pipe being of another type since the internal tube is metallic and corrugated, instead of being polymeric and smooth. Moreover, this document simply discloses the fact that the helix angles of the two pairs of tensile armors are less than (or equal to) 55°. In one particular example, it also teaches a combination of an angle greater than 35° for the inner pair of armors and an angle less than 30° for the outer pair of armors, which is completely different from the combination specific to the invention, which will be defined later.

SUMMARY OF THE INVENTION

Thus, the objective of the present invention is to remedy the aforementioned drawbacks of the structures of the prior art by providing a subsea flexible pipe that can be used for transporting gaseous hydrocarbons under high pressure.

For this purpose, the present invention provides a flexible tubular pipe intended for transporting fluids in the offshore oil production field, said pipe being of the unbonded smooth-bore type, and comprising at least, from the inside outward, a smooth-walled internal polymeric tube, a pressure vault formed by the short-pitch winding of at least one wire, a first, inner pair of crossed tensile armor plies, a polymeric intermediate sheath and a second, outer pair of crossed tensile armor plies; in addition, said pipe is characterized in that the inner pair of tensile armor plies is wound with a helix angle equal to or less than 35° and in that the outer pair of tensile armor plies is wound with a helix angle approximately equal to 55°.

The helix angles are expressed in absolute value, i.e. without taking into account the sign due to the direction of the winding. Each pair of tensile armor plies consists of two crossed plies wound in opposite directions with helix angles that are approximately equal in absolute value, this having the effect of balancing the take-up of tensile forces, while preventing torsional forces from being generated. The term "short-pitch winding" is understood to mean any winding in which the helix angle is close to 90°, and in practice between 70° and 90°. The term "long-pitch winding" is understood to mean any winding in which the helix angle is less than 55°.

Thus, one feature of the invention lies in the particular combination of the helix angles of the inner and outer armor plies. This combination gives the smooth-bore pipes properties that make them suitable for transporting gas under high pressure. The relatively low helix angle of the inner tensile armor plies promotes longitudinal drainage of the diffusion gases right to the means for evacuating said gases that are generally located at the ends of the pipe. It also improves the tensile strength of said inner plies, thereby enabling them to take up most of the axial forces endured by the pipe. In practice, the inner armor plies take up more than 70%, and advantageously more than 80%, of the axial forces. This makes it possible to reduce the thickness and the weight of the outer tensile armor plies and consequently the weight of the pipe.

The 55° angle gives the outer tensile armor plies the capability of withstanding both radial internal pressure forces and axial longitudinal tensile forces. This feature makes it possible to construct a device for the double confinement of the gas flowing in the pipe, thereby solving the safety problem. In normal operation, the gas flows inside the internal polymeric sealing tube supported by the pressure vault and the inner armor plies, this combination constituting the main confinement device. Although drainage of the diffusion gases is particularly effective, it is not possible to completely exclude the risk of damage to the internal polymeric tube, in particular when the pipe undergoes rapid decompression. However, this incident, which may result in a loss of sealing of said internal tube, is not detectable at the moment when it occurs. Upon repressurization, a pipe according to the present invention, the internal tube of which would have been accidentally torn, is however capable of taking up the internal pressure without leaking and without bursting. This is because, in such a case, the internal pressure is applied directly on the internal face of the intermediate impermeable polymeric sheath, which is itself supported by the outer tensile armor plies wound at 55°. The intermediate sheath and the outer tensile armor plies therefore constitute a backup confinement device capable of taking over from the main confinement device should the latter become defective.

The outer armor plies wound at 55° also have the property of virtually not withstanding the radial crushing forces directed toward the interior of the pipe, so that they transmit these forces to the internal layers. This property makes it possible to lay the pipe with a vertical tensioner of the type described in patent application FR 2 721 635 and known to those skilled in the art by the term "vertical laying system". Such a laying method is designed for deep water depths. It requires the clamping forces on the pipe between the plates of the vertical caterpillar tracks to be transmitted to the tensile armor plies in such a way that said plies can take up the tensile forces generated by the weight of the pipe as it is being lowered from the laying ship. In the case of the present invention, it is the inner armors that have the greatest tensile strength and must therefore take up most of the tensile forces during laying. This is made possible by the fact that all the layers surrounding the inner armor plies can transmit the caterpillar track clamping forces without significant weakening, so that the inner armor plies are blocked, in line with the caterpillar tracks, against the pressure vault which itself takes up almost all these clamping forces without being significantly deformed.

The choice of a smooth-bore solution instead of the rough-bore solutions of the prior art has many advantages. Firstly, it makes it possible to address the vibration and resonance problems because of the omission of the internal carcass causing these phenomena. Secondly, it helps to reduce the pressure drop of the flow along the pipe.

Furthermore, the inner pair of tensile armor plies is preferably wound with a helix angle equal to 30° or less. It therefore improves the diffusion gas drainage and the tensile strength of the inner pair of armor plies.

In addition, the inner pair of tensile armor plies advantageously includes at least one duct for the drainage and evacuation of the diffusion gases. This feature makes diffusion gas drainage more effective. This duct constitutes a preferential gas flow path and can be used to force the diffusion gases to flow along the pipe to the evacuation means generally located at the ends of the pipe. Patent application FR 2 858 841 describes draining methods that can be advantageously employed with this device. They consist in the use of one or more ducts lodged within the armor plies in order to pump out the diffusion gases or to inject a driving gas of the nitrogen type so as to force the diffusion gases back to the evacuation means. It would also be possible to dispense with the pumping or injection means and use said duct or ducts as simple passive means that facilitate diffusion gas flow to the evacuation means.

Furthermore, the flexible tubular pipe preferably includes means for monitoring the sealing of the internal polymeric tube by comparing the pressures on the one hand inside the pipe and on the other hand within the annular space lying between the internal polymeric tube and the intermediate sheath. Any collapse of the internal polymeric tube is virtually undetectable when it occurs, generally during a rapid pipe decompression phase. However, upon repressurizing the pipe it is possible to detect any loss of sealing of said internal tube by measuring the pressure in the annular space lying between the internal tube and the intermediate sheath and by comparing it with the pressure inside the pipe. If these two pressures are substantially the same, it is because there has been a loss of sealing of the internal tube. The pressure in the annular space may be measured directly at one of the two ends of the pipe, or by the use of one of the ducts lodged within the inner armor plies.

This detection device also makes it possible to avoid oversizing the outer pair of armor plies. On the one hand, provided that the internal polymeric tube is integrated, the outer pair of armor plies is stressed very little since most of the forces are taken up by the pressure vault and the inner pair of armor plies. On the other hand, if the tube is damaged it is possible for this damage to be rapidly detected, in practice in less than 1 minute, when the pressure in the pipe rises, so that it becomes possible for production to be rapidly stopped before the service pressure is reached. Thus, the backup confinement device formed by the intermediate sheath and the outer armor plies may advantageously be sized with a pressure resistance performance substantially lower than that of the main confinement device formed by the internal tube, the pressure vault and the inner armor plies. In practice, the burst pressure of the main confinement device is approximately twice the maximum service pressure of the pipe, because of the safety factors intended in particular to guarantee operation over a lifetime in excess of 20 years. Whenever the system for monitoring the sealing of the internal tube is employed, it is unnecessary for the backup confinement device to have a lifetime and a performance as high as those of the main confinement device. In this case, the burst pressure of the backup confinement device may advantageously be of the order of the maximum service pressure, i.e. half that of the main confinement device.

Furthermore, the ratio of, on the one hand, the combined thickness of the pressure vault and the first, inner pair of tensile armor plies to, on the other hand, the combined thickness of the second, outer pair of tensile armor plies is advantageously between 1.5 and 3. This makes it possible for the thickness of the outer armor plies to be significantly reduced and therefore for the cost and the weight of the pipe to be reduced, whilst still ensuring that the backup confinement device has a burst strength sufficient to solve the aforementioned safety problem.

In addition the tubular flexible pipe advantageously includes a polymeric external sheath surrounding the second, outer pair of tensile armor plies. This sheath protects the armors from corrosion and shocks that may occur during handling.

Other features and advantages of the invention will become apparent on reading the following description of particular embodiments of the invention given by way of indication, but implying no limitation, with reference to the appended drawings:

DESCRIPTION OF PREFERRED EMBODIMENT

The flexible tubular pipe 1 of the invention is intended for offshore oil production and more particularly for transporting gaseous or two-phase hydrocarbons. It is of the unbonded type and meets the specifications defined in the normative document API 17J.

Figure 1:
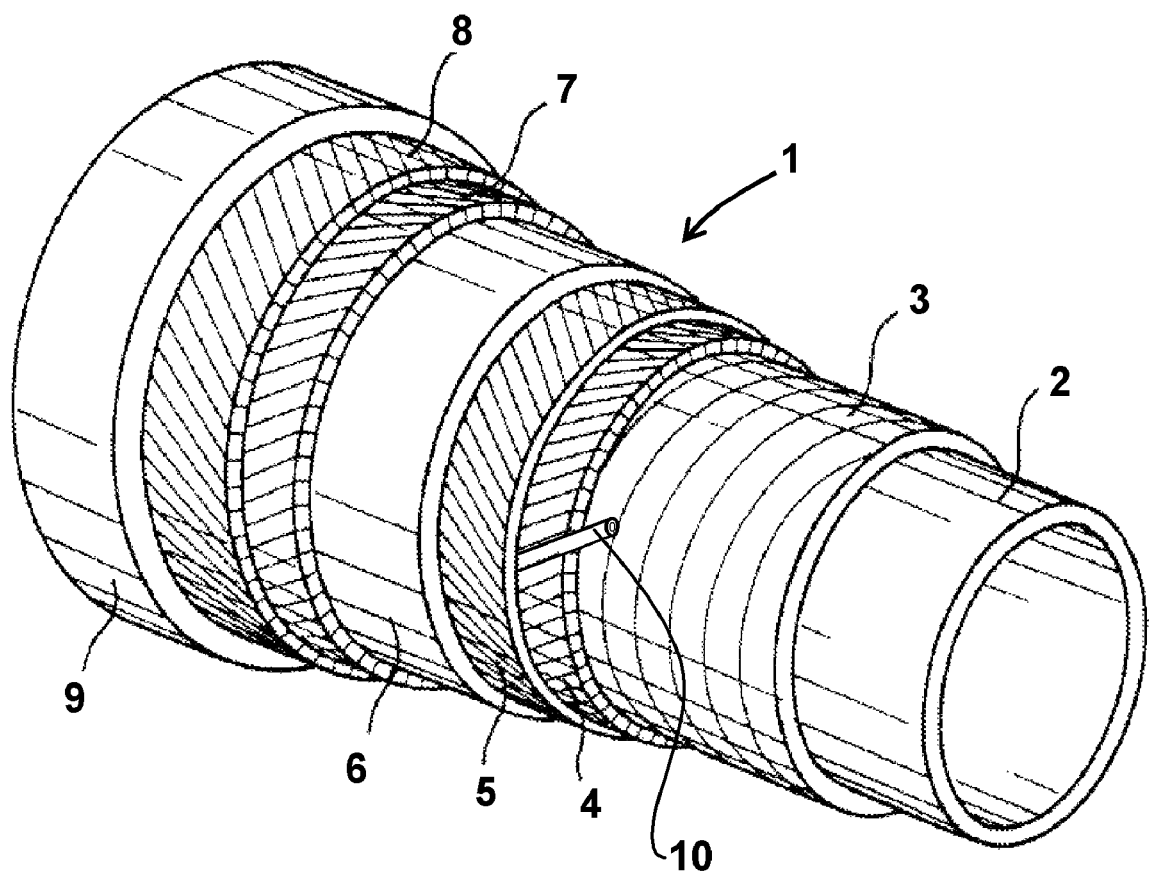
FIG. 1 is a partial schematic view in perspective of a flexible tubular pipe according to the invention.

According to the embodiment of the invention illustrated in FIG. 1, the innermost element of the flexible tubular pipe 1 is an internal polymeric tube 2, which is generally manufactured by extrusion. It has the function of sealing the duct within which the fluid flows and of withstanding the radial pressure due to the internal pressure exerted by said fluid with the aid of the pressure vault 3. The internal wall of this tube is smooth, so that the pipe is referred to as a smooth-bore pipe.

The pressure vault 3 is formed by a short-pitch winding of an interlocking profiled metal wire. This profiled wire has for example a Z-shaped profile, commonly called a zeta profile, but other profiles may also be suitable, such as, for example, T-shaped or U-shaped profiles. The function of the pressure vault 3 is to take up the radial forces exerted on the pipe, such as those generated by the internal pressure, the external pressure or the clamping of the pipe while it is being laid. The pressure vault may also include a second short-pitch winding of a wire having an approximately rectangular cross section, called a hoop, intended to increase the resistance of the assembly to radial forces.

The pressure vault 3 is surrounded by two crossed tensile armor plies 4, 5. These plies are called internal or inner plies as they are located inside the polymeric intermediate sheath 6. According to the present invention, these two plies are wound with a helix angle having an absolute value equal to or less than 35° and preferably equal to or less than 30°. The pair of inner armor plies 4, 5 takes up most of the axial tensile forces undergone by the pipe in service or while it is being laid offshore.

A polymeric intermediate sheath 6, generally produced by extrusion, surrounds the internal armor plies 4, 5. This intermediate sheath is intended to reduce the risk of the polymeric internal tube 2 collapsing should there be a loss of sealing or no sealing of the polymeric external sheath 9. This is because, in such a case, the hydrostatic pressure around the pipe 1 is taken up by the polymeric intermediate sheath 6 which is itself supported by the internal armor plies 4, 5 and by the pressure vault 3. The intermediate sheath 6 also has the function of acting as backup confinement of the gas flowing in the pipe should there be a loss of sealing of the internal tube 2.

The internal annular space lying between the internal tube 2 and the intermediate sheath 6 must be drained so as to prevent gas that has diffused through the internal tube 2 from accumulating and rising in pressure. This is because excessive pressure in the internal annular space may cause the internal tube 2 to collapse when production stops and the pipe is depressurized. In practice, to avoid this risk, it is necessary to ensure that the pressure in the internal annular space remains below a few bar. In general, the internal annular space is connected to the open air at at least one of the two ends of the pipe, especially at the upper end of risers for providing the link between the seabed and a support floating on the surface. Thus, close to this venting point the pressure inside the internal annular space is 1 bar. The diffusion gases can flow along the internal annular space, in particular along the wires constituting the internal armor plies 4, 5, the gaps between these wires constituting as it were flow paths. The fact that the helix angle of the internal plies 4, 5 is low is a favorable parameter that helps to drain the diffusion gases, owing to the reduction in length of these flow paths and in the associated pressure drop. This small pressure drop makes it possible for the diffusion gases to drain away over large distances, thereby greatly reducing the risk of unacceptable overpressurization, to the evacuation means at atmospheric pressure.

The intermediate sheath 6 is surrounded by an outer pair of crossed tensile armor plies 7, 8 that are wound with a helix angle of approximately equal to 55°. In practice, the absolute value of these helix angles is between 54° and 56°. This particular angle gives the outer armor plies 7, 8 the capability of withstanding radial internal pressure forces and axial longitudinal tensile forces. In practice, the outer armor plies 7, 8 take up around 15% to 25% of the axial tensile forces endured by the pipe, the remainder being taken up by the inner plies 4, 5. In addition, the external plies 7, 8 are sized so as to be capable, in association with the intermediate sheath 6, of taking up the service pressure of the pipe, should there be a loss of sealing of the internal tube 2.

An external polymeric sheath 9, generally produced by extrusion, surrounds and protects the pipe.

The reliability of the flexible tubular pipe 1 depends to a large extent on the quality of the diffusion gas drainage along the internal annular space. Any failure of the drainage may result, during a production stoppage and decompression phase, in collapse and loss of sealing of the internal tube 2.

Figure 2:
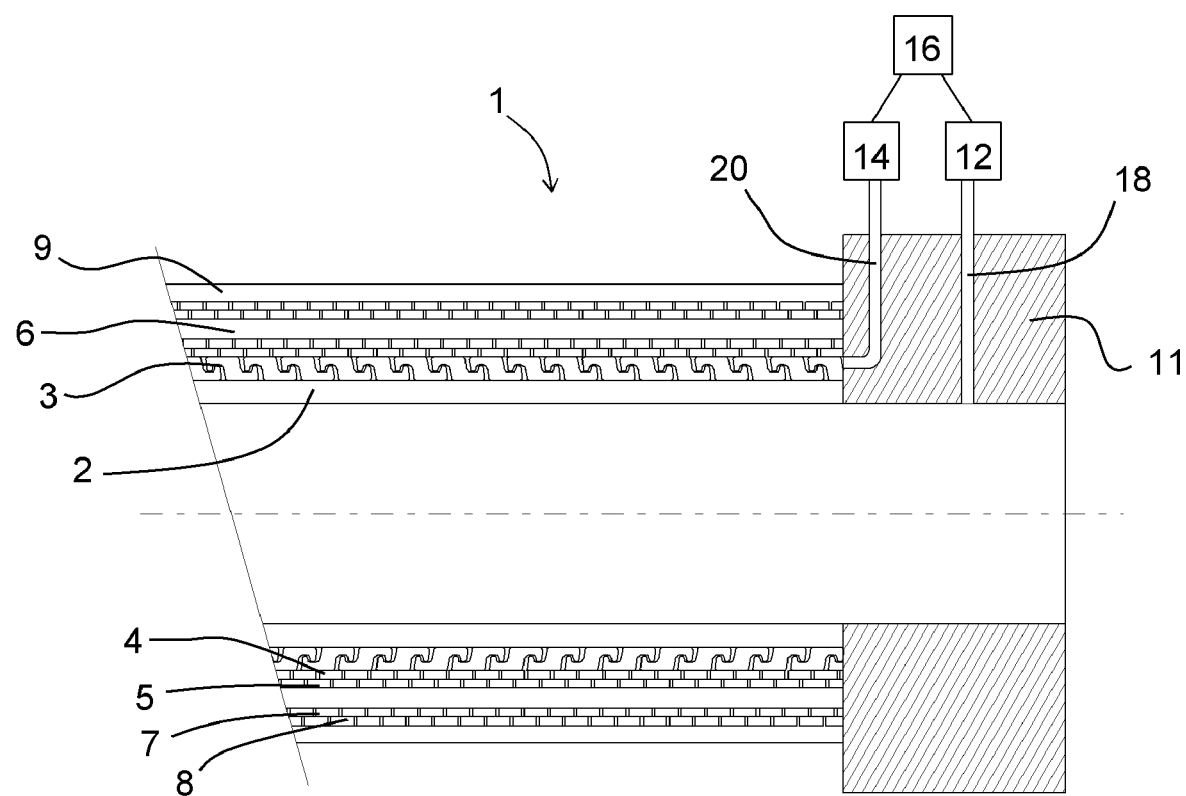
FIG. 2 is a partial schematic view of the means for monitoring the sealing of the internal polymeric tube.

In such a situation, the backup confinement device and the monitoring means shown in FIG. 2 make it possible to repressurize and detect the damage of the internal tube 2 without running the risk of the pipe bursting. The monitoring means comprise two pressure sensors 12, 14 and a device 16 for recording and processing the measurements made by these two sensors. The first sensor 12 measures the pressure of the gas flowing inside the pipe. The second sensor 14 measures the pressure within the annular space lying between the internal polymeric tube 2 and the polymeric intermediate sheath 6. These two sensors 12, 14 are advantageously placed in immediate proximity of an end-fitting 11 of the flexible pipe 1. The sensor 12 is connected to the inside of the flexible pipe 1 via a metal tube 18 passing right through the wall of the end-fitting 11, in such a way that it is permanently subjected to the pressure inside the flexible pipe 1. Likewise, the sensor 14 is connected to the annular space lying between the internal polymeric tube 2 and the polymeric intermediate sheath 6 via a metal tube 20 passing partly through the wall of the end-fitting 11. The device 16 continuously records and compares in real time the pressure measurements made by the two sensors 12, 14. As the pressure in the flexible pipe 1 progressively rises, the device makes it possible for an alarm to be automatically and rapidly actuated if the pressures measured by the two sensors become substantially equal because of a sealing fault in the internal tube 2. This alarm makes it possible, if necessary, for the pressurization to be immediately stopped long before the burst limit of the backup confinement device is reached. This solution solves the safety problem but not the reliability problem since as soon as the internal tube 2 is damaged the pipe must in the end be replaced.

The quality of the gas diffusion drainage and therefore the reliability of the pipe may advantageously be improved by inserting one or more ducts 10 within the internal armor plies 4, 5. Such a duct or ducts 10 are metal tubes having a diameter advantageously slightly smaller than the thickness of the armor ply within which they are inserted. The first end of each duct 10 opens into the internal annular space and the second end opens to the outside of the pipe, in a termination end-fitting of the latter. In the configuration of a riser, the ducts 10 in the upper part open into the end-fitting for connecting the pipe 1 to the production platform and in the lower part into the internal annular space of the pipe 1 at various points longitudinally distributed along the pipe, for example every 500 m. These ducts 10 constitute redundant diffusion gas flow paths. In addition, they make it possible to suck out the diffusion gases or to force them to flow out by injecting a driving gas of the nitrogen type. In particular, this avoids the risk of the internal annular space being obstructed by the condensation of water vapor that has diffused through the internal tube 2. Such condensates, if they are not removed, may accumulate at the low points and thus form liquid plugs which then impede the flow of diffusion gases. Patent application FR 2 858 841, to which the reader may refer, describes this phenomenon and explains in detail the various ways of using the ducts 10. Advantageously, these ducts may be used for pumping out the inside of the internal annular space so as to create a partial vacuum therein. This operation is particularly appropriate before a shutdown and decompression phase of the pipe 1. It ensures that there is no local overpressurization within the internal annular space. The ducts 10 may also act as the metal tube 20 of FIG. 2, namely allowing the pressure sensor 14 to be shifted far from its measurement point in the annular space lying between the internal polymeric tube 2 and the polymeric intermediate sheath 6.

Advantageously, the thickness of the outer armor plies 7, 8 is approximately equal to that of the inner armor plies 4, 5. The thickness of the pressure vault 3 is generally greater than the combined thickness of the inner armor plies 4, 5. Thus, for example in the case of a pipe with an inside diameter of 350 mm designed to be operated with a maximum service pressure of 240 bar, the pressure vault 3 has a thickness of 12 mm and each of the four armor plies 4, 5, 7, 8 has a thickness of 5 mm. The main confinement device therefore has a combined thickness of the metal reinforcements equal to 12+5+5=22 mm. The backup confinement device itself has a combined thickness of the metal reinforcements equal to 5+5=10 mm, which is substantially smaller than that of the main confinement device. In this example, the ratio of, on the one hand, the combined thickness of the pressure vault 3 and the first, inner pair of tensile armor plies 4, 5 to, on the other hand, the combined thickness of the second, outer pair of tensile armor plies 7, 8 is therefore equal to 22 mm/10 mm=2.2.

The invention claimed is:

1. A flexible tubular pipe intended for transporting gaseous hydrocarbons in an offshore oil production field, the pipe being of the unbonded smooth-bore type, the pipe comprising at least, from the inside outward,
    a smooth-walled internal polymeric tube,
    a pressure vault formed by a short-pitch winding of at least one wire,
    a first, inner pair of crossed tensile armor plies wound with a helix angle equal to or less than 35°,
    a polymeric intermediate sheath, and
    a second, outer pair of crossed tensile armor plies wound with a helix angle approximately equal to 55°; and
    the pipe further comprising an annular space lying between the internal polymeric tube and the polymeric intermediate sheath,
    a monitor of the sealing of the internal polymeric tube, the monitor being configured to compare a first pressure inside the pipe and a second pressure within the annular space.

2. The flexible tubular pipe as claimed in claim 1, further comprising at least one duct configured for drainage and evacuation of diffusion gases located at the inner pair of tensile armor plies.

3. The flexible tubular pipe as claimed in claim 1, further comprising a ratio of the combined thickness of the pressure vault and the first, inner pair of tensile armor plies to the combined thickness of the second, outer pair of tensile armor plies is between 1.5 and 3.

4. The flexible tubular pipe as claimed in claim 1, further comprising a polymeric external sheath surrounding the second, outer pair of tensile armor plies.

5. The flexible tubular pipe as claimed in claim 2, wherein the at least one duct is oriented along a direction of extension of the pipe.

* * * * *